United States Patent
Lu

(10) Patent No.: US 7,572,032 B2
(45) Date of Patent: Aug. 11, 2009

(54) LAMP ASSEMBLY OF A PROJECTION APPARATUS

(75) Inventor: Chang-Hsing Lu, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 208 days.

(21) Appl. No.: 11/466,193

(22) Filed: Aug. 22, 2006

(65) Prior Publication Data

US 2007/0109786 A1    May 17, 2007

(30) Foreign Application Priority Data

Nov. 16, 2005   (TW) .............................. 94140342 A

(51) Int. Cl.
*F21V 19/02*  (2006.01)
*F21V 7/00*   (2006.01)
*F21S 8/08*   (2006.01)
*F21S 8/00*   (2006.01)
*B60Q 1/06*   (2006.01)

(52) U.S. Cl. ...................... 362/285; 362/289; 362/306; 362/418; 362/419; 362/420; 362/421; 362/422; 362/423; 362/424; 362/425; 362/426

(58) Field of Classification Search ................ 362/285, 362/289, 306, 418–426
See application file for complete search history.

(56) References Cited

U.S. PATENT DOCUMENTS 6,575,606  B2 *   6/2003   Shaw ......................... 362/433
2004/0165386  A1 *   8/2004   Lee et al. ..................... 362/418

* cited by examiner

*Primary Examiner*—William J. Carter
(74) *Attorney, Agent, or Firm*—Patterson, Thuente, Skaar & Christensen, P.A.

(57) ABSTRACT

A lamp assembly of a projection apparatus which has a function of adjusting the position of the lamp device is disclosed. The lamp assembly includes an outer housing, a lamp module, a transversely adjustable device and a vertically adjustable device. The lamp module is detachably disposed in the outer housing with the transversely and vertically adjustable devices disposed on the outer housing. When the lamp module is located within the outer housing, the lamp module can be adjusted by operating the transversely and vertically adjustable devices.

9 Claims, 5 Drawing Sheets

LAMP ASSEMBLY OF A PROJECTION APPARATUS

This application benefits from the priority of Taiwan Patent Application No. 094140342 filed on Nov. 16, 2005.

CROSS-REFERENCES TO RELATED APPLICATIONS

Not applicable.

BACKGROUND OF THE INVENTION

1. Field of the Invention

The present invention relates to a lamp assembly of a projector. In particular, the present invention relates to a lamp assembly of a projection apparatus having a function of adjusting the position of the lamp device.

2. Descriptions of the Related Art

There are various types of projection apparatuses on the market. A digital light processing projector (DLP), for example, comprises a reflector and an imaging device. The reflector consists of a lamp, a color wheel and an integration rod for projecting a uniform and concentrated light beam to the imaging device to produce an image at the output end. In fact, the reason why the scattering light provided by the above lamp can project uniform lights and increase light output efficiency is because the integration rod has a specific cross section. The cross section is generally in a shape of a rectangle as to produce a final rectangular image at the screen output. This cross section, in association with the light reflection resulted from the groups of reflecting mirrors disposed within the integration rod (called a "light tunnel"), make uniform lights and improved light output efficiency possible.

In view of the constraints of the small cross-section of the integration rod (i.e. limited light tunnel space), if the center of the principal projecting lights from the lamp device is off-center in view of the center of the cross section of the light tunnel, or deviates beyond the range defined by the light tunnel, the light beam uniformity and light output efficiency would significantly be compromised.

The DLP manufacturers and sellers may rely on their assembling techniques to adjust the center of the lamp's wick so that the front end coincides with the reflector at the rear end, thus, aligning the light source with the cross section of the integration rod. However, the adjustment procedure is very complicated and costly. When the lamp does not work, consumers have no means of replacement, and end up trying to maneuver the complicated adjustment themselves. Moreover, the professional technicians cannot precisely center the lights under the circumstance of no appropriate adjustment tools if they go to the consumers' place. Even if the whole projector is sent back to the dealer for repair, professional technicians must implement complicated adjusting procedures after the lamp is well repaired and replaced.

Nowadays, the DLP manufacturers and sellers are usually not the manufacturers of the lamp; instead, DLP manufacturers and sellers purchase lamps from the cooperative manufacturers for assembly. To keep costs down, the lamp manufacturers do not always consider the designing tolerance for being assembled to the projection apparatus. It follows that the center of the light beams coming from the light bulb and projecting from the back reflectors are significantly off-center from the cross-section center of the integration rod. This causes the obvious loss of light uniformity and brightness. To make up for the loss, in view of the foregoing descriptions, the technicians need to exercise a complicated adjustment and fixation for the alignment, both of which are not time- nor cost-effective.

Even simplifying the structure using related technology is not enough to solve the above problems. For example, the lamp adjustable apparatus of Taiwan Patent No. 547674 comprises a base, an adjustable module received in the base, an adjustable element and a returning element. The adjustable element and the returning element are placed on a surface opposite to the base. The adjustable module comprises a plurality of adjustable plates. The adjustable plates are combined with a plurality of guide holes and guide rods. One end of the lamp device is fixed on the adjustable module. The adjustable module can only be adjusted by combining the guide holes with the resilient guide rods of the adjustable plates. As can be seen, there are too many additional parts on the lamp cover, making it difficult and expensive to assemble. Furthermore, for both consumers and technicians, it is very difficult for them to replace the lamp with the required adjustments themselves.

In conclusion, the structures or apparatuses for adjusting the lamp device position in the prior art face problems of high lamp cost and assembling complexity. Therefore, it is very important for manufacturers to use simpler mechanical designs to reduce the difficulty in lamp device adjustment, specifically with respect to the precise alignment between the light projection and the light tunnel. In addition, it is important for users to purchase a lamp module which has already been adjusted and positioned by the dealers and is ready for assembly on to the optical engine, thereby controlling the costs.

SUMMARY OF THE INVENTION

An object of the present invention is to provide a lamp assembly of a projection apparatus having a function of adjusting the position of the lamp device. The lamp assembly comprises an outer housing, a lamp module, a transversely adjustable device and a vertically adjustable device, wherein the outer housing is fixed on an optical engine of the projection apparatus. The outer housing comprises a top face, a side face and a light outlet. The lamp module, comprising an inner housing, a lamp device and a fastening device, is detachably disposed in the outer housing; the lamp module. A transversely adjustable device is disposed on the outer housing, and adjusts the lamp device along a transverse position via the top face of the outer housing and the top face of the inner housing. A vertically adjustable device is disposed on the outer housing, and adjusts the lamp device along a vertical position via the side face of the outer housing and the side face of the inner housing.

The lamp module is formed by fixing the lamp device on the inner housing the fastening device. Before the lamp module is shipped out of the factory, lamp module manufacturers adjust the lamp device in advance by employing a transversely adjustable device and/or a vertically adjustable device. With this simpler design, the lamp module provides a lamp device that is ready for replacement and the users do not have to adjust the lamp device after purchasing the whole module, thereby efficiently controlling the cost.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
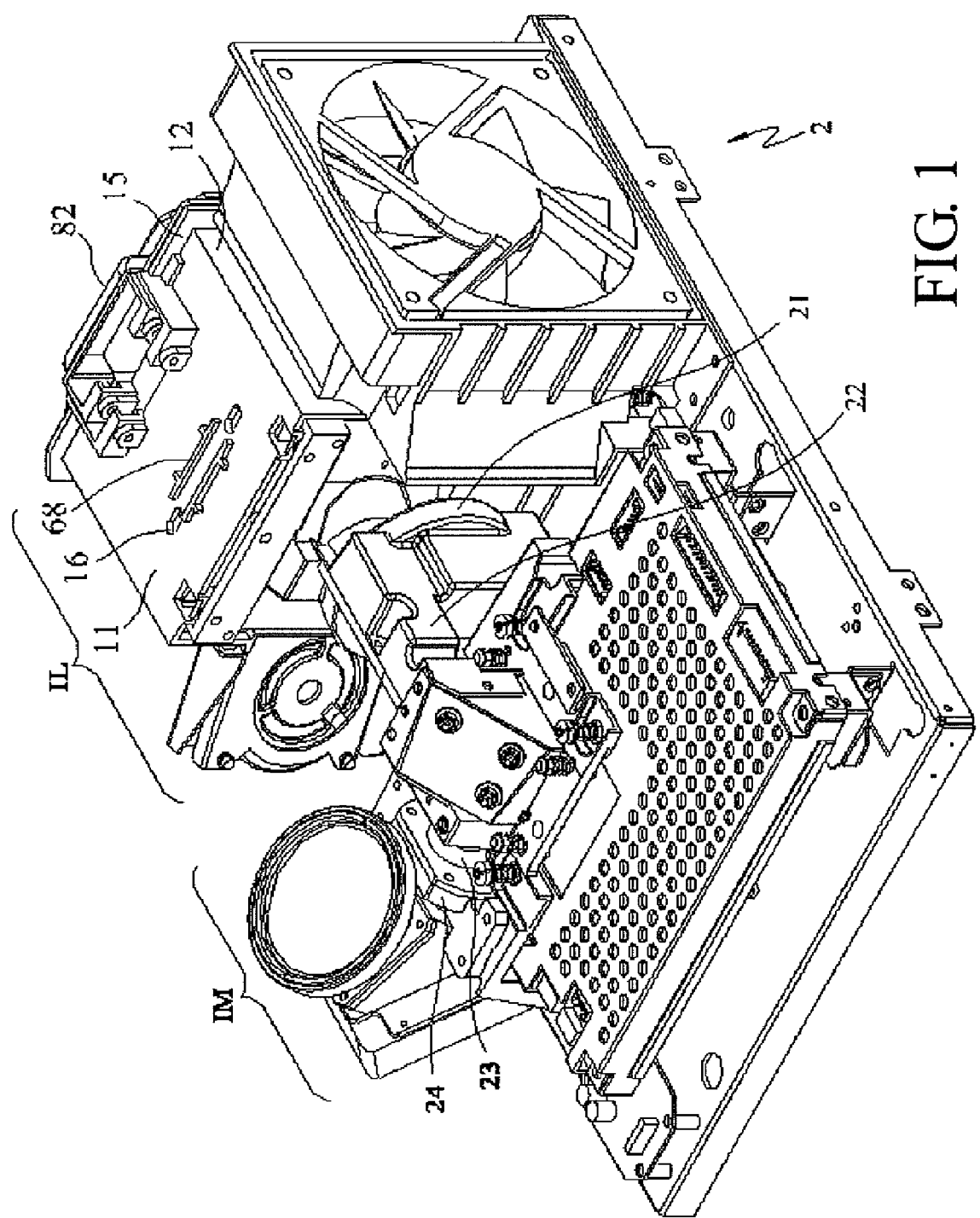
FIG. 1 is a schematic, perspective view showing the optical engine which includes a lamp assembly according to the present invention.
Figure 2:
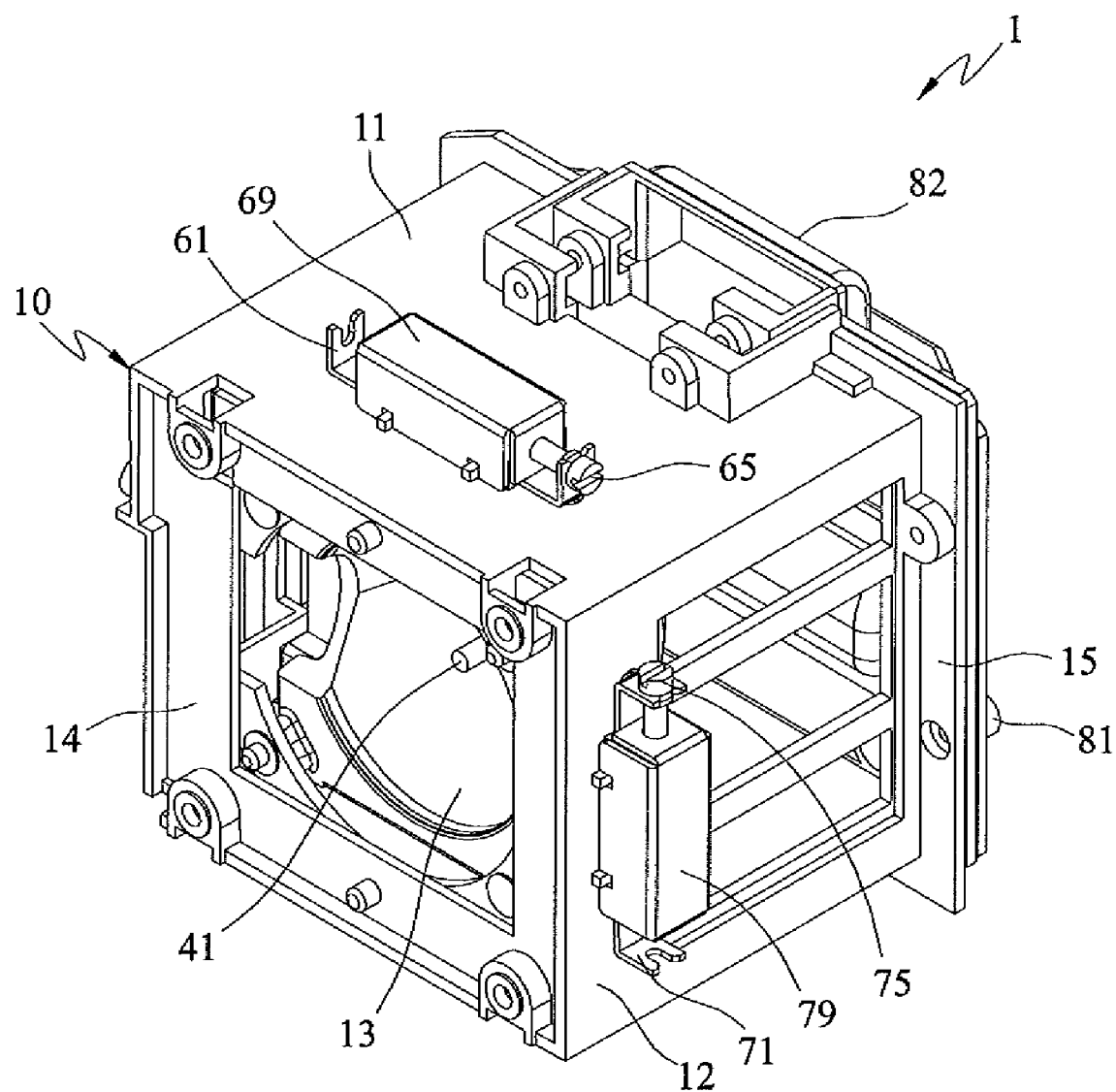
FIG. 2 is a perspective view showing the lamp module of the present invention.
Figure 3:
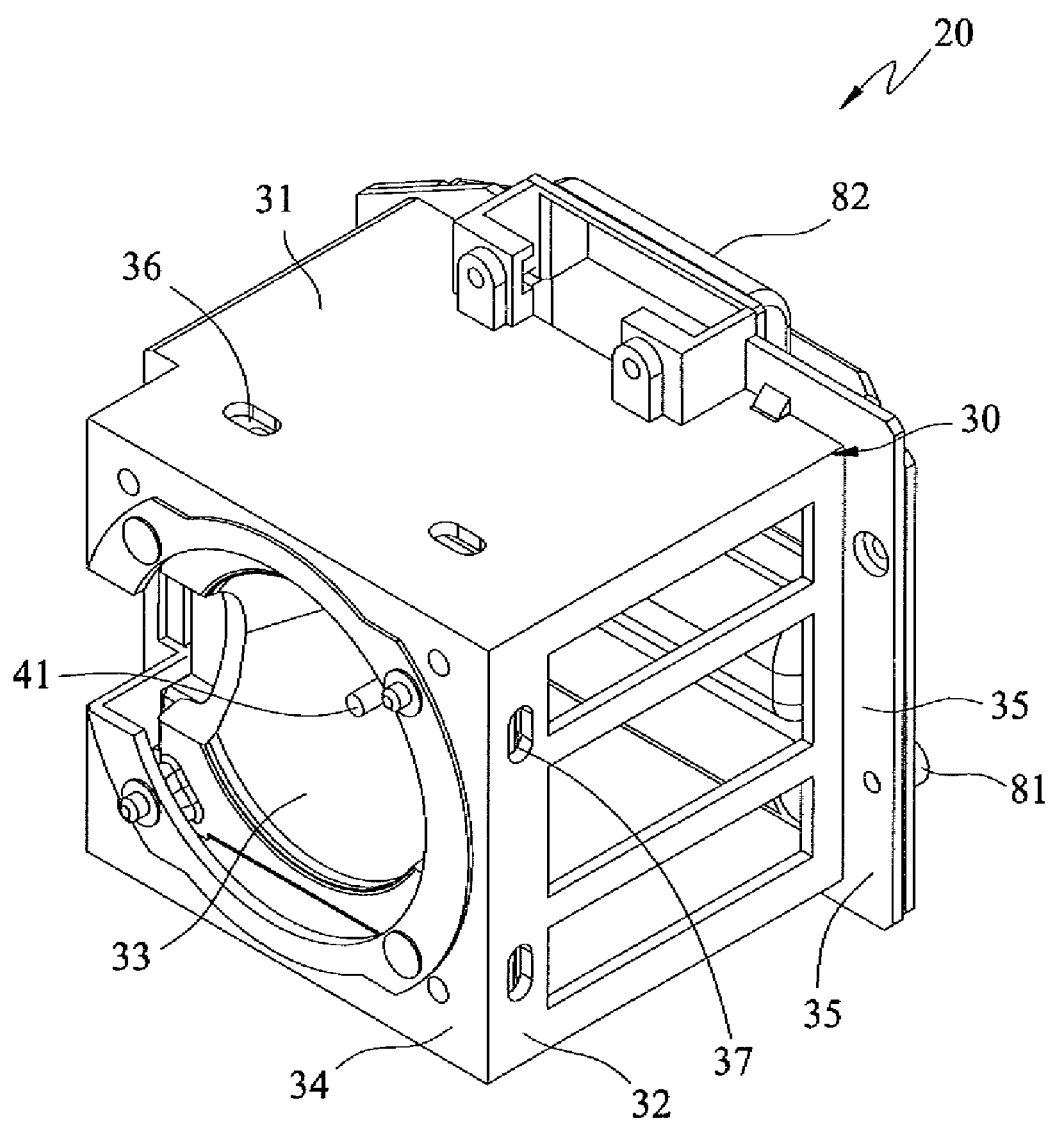
FIG. 3 is a perspective view showing the lamp module assembled in the outer housing of the present invention.
Figure 4:
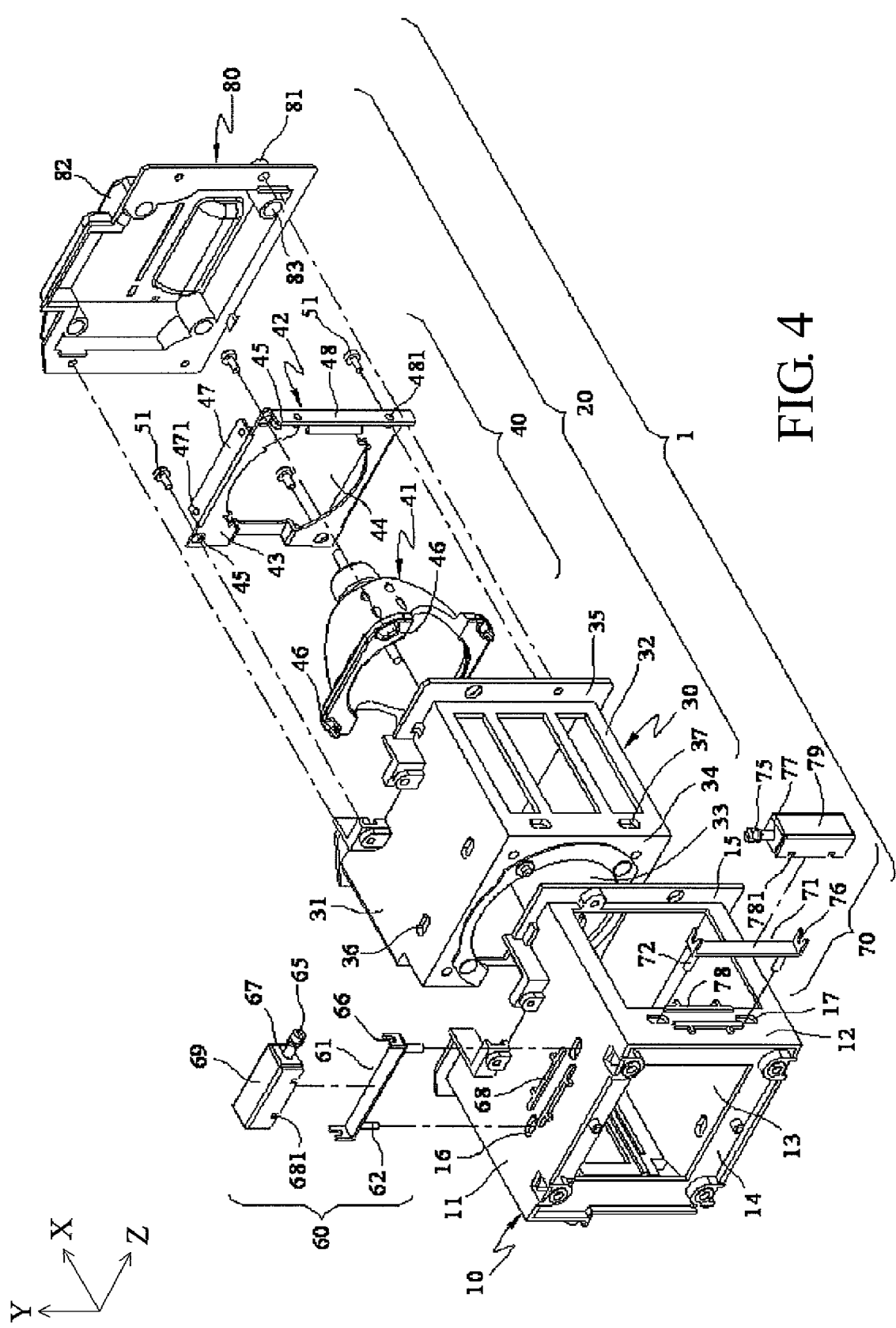
FIG. 4 is an exploded view of FIG. 3.

With reference to FIGS. 1 to 5, a lamp assembly 1 of a projection apparatus having a function of adjusting the position of the lamp device comprises an outer housing 10, a lamp module 20, a transversely adjustable device 60 and a vertically adjustable device 70.

The outer housing 10, which comprises a top face 11, a side face 12 and a light outlet 13, is fixed on an optical engine 2 of a projection apparatus. The lamp module 20, which comprises an inner housing 30, a lamp device 40 and a fastening device, is detachably disposed in the outer housing 10. The inner housing 30 comprises a top face 31, a side face 32 and a light outlet 33. The lamp device 40 which is disposed in the inner housing 30 comprises a reflector 41 for projecting light beams substantially along an X axis from the light outlet 33 of the inner housing 30 to the light outlet 13 of the outer housing 10. The fastening device adjustably fixes the lamp module 20 onto the inner housing 30 along the X axis. The transversely adjustable device 60 is disposed on the outer housing 10 and adjusts the position of the lamp device 40 along a Z axis via the top face 11 of the outer housing 10 and the top face 31 of the inner housing 30, while the vertically adjustable device 70 is disposed on the outer housing 10 and adjusts the position of the lamp device 40 along an Y axis via the side face 12 of the outer housing 10 and the side face 32 of the inner housing 30.

Preferably, both the outer housing 10 and the inner housing 30 are substantially parallelepiped, with the outer housing 10 comprising an inner end 14 and an outer end 15 and the inner housing 30 comprising an inner end 34 and an outer end 35. The light outlet 13 of the outer housing 10 is formed at the inner end 14 of the outer housing 10, while the light outlet 33 of the inner housing 30 is formed at the inner end 34 of the inner housing 30. The lamp device 40 is installed into the inner housing 30 from the outer end 35 of the inner housing 30, and assembled with the inner end 34 of the inner housing 30, while the inner housing 30 is installed into the outer housing 10 from the outer end 15 of the outer housing 10, and assembled with the inner end 14 of the outer housing 10.

The lamp module 20 comprises an inner housing 30, a lamp device 40 and a fastening device. The lamp module 20 preferably comprises a cover 80 and a handle 81, with the cover 80 fixed on to the outer end 35 of the inner housing 30 for substantially enclosing the lamp device 40 in the inner housing 30. The cover 80 is formed with a working space (e.g. the adjustable window 83 that is constituted by a plurality of hollow posts) for the user to insert a screwdriver to adjust the fastening device. The handle 81 is fixed on to an outer surface 82 of the cover 80 for conveniently installing the lamp module 20 into the outer housing 10 or taking it out from the outer housing 10. The lamp device 40 comprises a bracket 42. The bracket 42 comprises an outer frame 43, with an insertion 44 forming at the outer frame 43. The fastening device fixes the reflector 41 on the inner end 34 of the inner housing 30 along the X axis through the outer frame 43 of the bracket 42. In a further preferred embodiment, the fastening device comprises a plurality of fixing screws 51. Each of the outer frames 43 of the bracket 42 and the reflector 41 is formed with a plurality of fixing holes 45, 46, respectively, for receiving the fixing screws to pass therethrough. The working space of the cover 80 comprises a plurality of adjustable windows corresponding to the fixing screws 51 for the user, via the adjustable windows of the cover 80, to adjust the fixing screws 51 by inserting them into the fixing holes 45, 46 to position the reflector 41.

On the other hand, the top face 11 of the outer housing 10 of the lamp assembly 1 of the projection apparatus provides the first group of transversely adjustable holes 16, while the side face 12 provides the first group of vertically adjustable holes 17. Likewise, the top face 31 of the inner housing 30 provides the second group of transversely adjustable holes 36, while the side face 32 provides the second group of vertically adjustable holes 37. The outer frame 43 of the bracket 42 is provided with a top wing 47 and a side wing 48. The top wing 47 provides the third group of transversely adjustable holes 471 while the side wing 48 provides the third group of vertically adjustable holes 481. When the lamp module 20 is assembled with the outer housing 10, the position of the first, second and third group of transversely adjustable holes 16, 36, 471 substantially correspond to one another. The position of the first, second and third group of vertically adjustable holes 17, 37, 481 also substantially correspond to one another. Preferably, any of the first, second and third groups of transversely adjustable holes 16, 36, 471 is provided with two adjustable holes in opposite directions, so that and any of the first, second and third groups of vertically adjustable holes 17, 37, 481 can be balanced and fixated.

Figure 5:
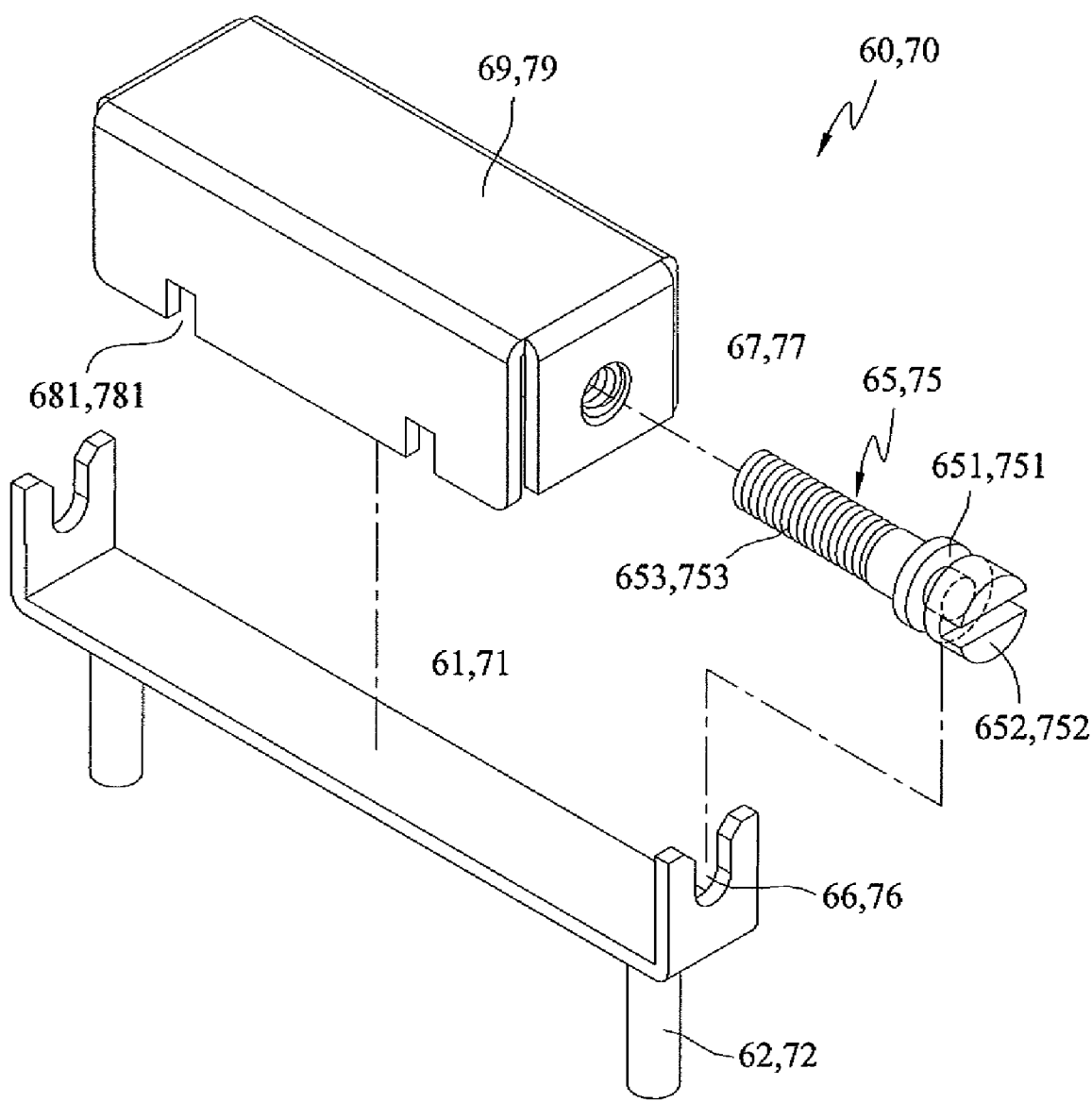
FIG. 5 is a preferred embodiment showing an example of a transversely adjustable device and a vertically adjustable device of the present invention.

In a preferred embodiment, the transversely adjustable device 60 comprises a transverse plate 61, two transversely pins 62, a first engaging edge 66, a second engaging edge 67 and a transversely control device. The transverse pins 62 extend inward from an internal surface of the transverse plate 61 for sequential insertion into the first, second and third transversely adjustable holes 16, 36, 471. The first engaging edge 66 extends outward from one side of the transverse plate 61, while the second engaging edge 67 is disposed on one side of the transversely adjustable cover 69. The transversely control device comprises a transversely positioning device and a transversely adjustable member 65, wherein the transversely positioning device comprises a pair of transverse ribs 68, which are disposed on the top face 11, and a transversely adjustable cover 69. The transversely adjustable cover 69 comprises a plurality of positioning slots 681 that substantially complement the shape of the transverse ribs 68. The transversely adjustable cover 69 is located on the top face 11 of the outer housing 10 with the transverse ribs 68 fitted within the positioning slots 681. With reference to FIG. 5, the transversely adjustable member 65 comprises a drive side 652 comprising a neck 651 and a threaded driven side 653. The neck 651 of the drive side 652 engages in the first engaging edge 66, while the driven side 653 engages in the second engaging edge 67 and is movable along the Z axis relative to the transversely adjustable cover 69 that is limited by the pair of transverse ribs 68.

The vertically adjustable device 70 comprises a vertical plate 71, two vertically pins 72, a first engaging edge 76, a second engaging edge 77 and a vertically control device. The vertically pins 72 extends inward from an internal surface of the vertical plate 71 for sequentially inserting into the first, second and third vertically adjustable holes 17, 37, 481. The first engaging edge 76 extends outward from one side of the vertical plate 71. The second engaging edge 77 is disposed on one side of the vertically adjustable cover 79. The vertically control device comprises a vertically positioning device and a vertically adjustable member 75, wherein the vertically positioning device comprises a pair of vertical ribs 78 and a vertically adjustable cover 79. The vertical ribs 78 are disposed on the side face 12 of the outer housing 10. The vertically adjustable cover 79 comprises a plurality of positioning slots 781 substantially complementing the shape of the vertical ribs 78 and is positioned on the side face 12 of the outer housing 10 by the vertical ribs 78 that are fitted with the positioning slots 781. With reference to FIG. 5, the vertically adjustable member 75 comprises a drive side 752 which has a neck 751 and a threaded driven side 753, while the neck 751 of the drive side 752 engages in the first engaging edge 76. The driven side 753 engages in the second engaging edge 77 and is movable along the Y axis relative to the vertically adjustable cover 79 that is limited by the pair of vertical ribs 78.

Before the lamp module 20 is adjusted along the Z axis, the fastening device (e.g. the fixing screws 51) is loosened by tools (e.g. a screwdriver) via the working space (e.g. the adjustable windows 83). The lamp module 20 is, therefore, loosened in view of the outer housing 20. The inner housing 30 can be adjusted along the Z axis in a manner so the transversely adjustable member 65 drives the transverse plate 61. In a similar way, when the lamp module 20 is adjusted along the Y axis, the inner housing 30 can be adjusted in a manner so the vertically adjustable member 75 drives the vertical plate 71. After completion of the adjustments along the Z and Y axes, the fixing screws 51 are tightened along the X axis via the adjustable windows 83. The reflector 41 of the lamp device 40, relative to the outer housing 10 which is fixed on the optical engine 2, is then accurately placed on the Y-Z plane. After adjustment, the transversely and vertically adjustable plates 61, 71, the transversely and vertically adjustable members 65, 75, and the transversely and vertically adjustable covers 69, 79 can be removed from the outer housing 10 until the next adjustment is needed. This is indeed an improvement in adjustment ability. Furthermore, the reuse of the adjusting tools (i.e. adjustable plates, members and covers) makes more economic use of the materials.

The above embodiments as described above only refer to exemplify the better examples of the present invention. Persons skilled in this field may make modifications equivalent to the arrangement, for example, changing the reference X-Y-Z coordinates, and fastening and adjusting measures between elements. However, the modifications shall fall within the scope of the invention as set forth in the appended claims.

What is claimed is:

1. A lamp assembly of a projection apparatus, comprising:
    an outer housing being adapted to be fixed on an optical engine of a projector, the outer housing comprising a top face, a side face and a light outlet, wherein the top face of the outer housing is formed with a first group of transversely adjustable holes defining at least two transversely adjustable holes, and the side face is formed with a first group of vertically adjustable holes defining at least two vertically adjustable holes;
    a lamp module detachably disposed in the outer housing, the lamp module comprising:
        an inner housing, comprising a top face, a side face and a light outlet, wherein the top face of the inner housing is formed with a second group of transversely adjustable holes defining at least two transversely adjustable holes, and the side face is formed with a second group of vertically adjustable holes defining at least two vertically adjustable holes;
        a lamp device disposed in the inner housing, comprising:
            a reflector for projecting light beams substantially along an X axis from the light outlet of the inner housing and the light outlet of the outer housing; and
            a bracket including a top wing and a side wing, the top wing being formed with a third group of transversely adjustable holes defining at least two transversely adjustable holes and the side wing being formed with a third group of vertically adjustable holes defining at least two vertically adjustable holes; and
        wherein when the lamp module is assembled with the outer housing, the first, second and third groups of transversely adjustable holes substantially correspond in position to one another, and the first, second and third groups of vertically adjustable holes also substantially correspond in position to one another;
    a transversely adjustable device disposed on the outer housing, being adapted to adjust the lamp device along a Z axis via the top face of the outer housing and the top face of the inner housing, the transversely adjustable device comprising:
        a transverse plate;
        two transverse pins extending inward from an internal surface of the transverse plate for sequentially inserting into the first, second and third transversely adjustable holes; and
        a transversely control device comprising a transversely positioning device and a transversely adjustable member, wherein the transversely positioning device is fixed on the top face of the outer housing; one side of the transversely adjustable member is connected to the transversely positioning device, and another side is connected on the transverse plate, the transversely adjustable member driving the transverse plate to move along the Z axis; and
    a vertically adjustable device disposed on the outer housing, being adapted to adjust the lamp device along a Y axis via the side face of the outer housing and the side face of the inner housing the vertically adjustable device comprises:
        a vertical plate;
        two vertically pins extending inward from an internal surface of the vertical plate for sequentially inserting into the first, second and third vertically adjustable holes; and
        a vertically control device comprising a vertically positioning device and a vertically adjustable member, wherein the vertically positioning device is fixed on the side face of the outer housing; wherein one side of the vertically adjustable member is connected to the vertically positioning device, and an opposing side of the vertically adjustable member is connected on the vertical plate, whereby the vertically adjustable member drives the vertical plate to move along the Y axis.

2. The lamp assembly of the projection apparatus as claimed in claim 1, wherein each of the outer housing and the inner housing are substantially a parallelepiped, and each of the outer housing and the inner housing has an inner end and an outer end; the light outlet of the outer housing is formed at the inner end of the outer housing, and the light outlet of the inner housing is formed at the inner end of the inner housing.

3. The lamp assembly of the projection apparatus as claimed in claim 2, wherein the lamp device is installed into the inner housing from the outer end of the inner housing, and assembled with the inner end of the inner housing; the inner housing is installed into the outer housing from the outer end of the outer housing, and assembled with the inner end of the outer housing.

4. The lamp assembly of the projection apparatus as claimed in claim 3, wherein the lamp device further comprises a bracket which has an outer frame and an insertion formed at the outer frame, the fastening device fixes the reflector on the inner end of the inner housing along the X axis via the outer frame of the bracket.

5. The lamp assembly of the projection apparatus as claimed in claim 4, wherein the lamp module further comprises a cover fixed on the outer end of the inner housing for substantially enclosing the lamp device in the inner housing.

6. The lamp assembly of the projection apparatus as claimed in claim 5, wherein the lamp module further comprises a handle fixed on an outer surface of the inner housing for conveniently installing the lamp module into the outer housing or taking the lamp module out of the outer housing.

7. The lamp assembly of the projection apparatus as claimed in claim 5, wherein the cover has a working space formed thereon for a user to operate the fastening device through the space.

8. The lamp assembly of the projection apparatus as claimed in claim 7, wherein the fastening device further comprises a plurality of fixing screws, the bracket and the reflector are provided with a plurality of fixing holes for receiving the fixing screws to pass therethrough, and the working space of the cover comprises a plurality of adjustable windows corresponding to the fixing screws for the user to adjust the fixing screws into the fixing holes to position the reflector via the adjustable windows of the cover.

9. The lamp assembly of the projection apparatus as claimed in claim 1, wherein:

the transversely adjustable device further comprises a first engaging edge and a second engaging edge, the first engaging edge extends outward from one side of the transverse plate; the transversely positioning device comprises a pair of transverse ribs and a transversely adjustable cover, the transverse ribs are disposed on the top face of the outer housing, the transversely adjustable cover comprises a plurality of positioning slots substantially complementing a shape to the transverse ribs, whereby the transversely adjustable cover is positioned on the top face of the outer housing through the transverse ribs fitted within positioning slots; the second engaging edge is disposed on one side of the transversely adjustable cover;

the transversely adjustable member comprises a drive side comprising a neck and a threaded driven side, the neck of the drive side engages in the first engaging edge, the driven side engages in the second engaging edge so as to move along the Z axis relative to the transversely adjustable cover and drive the transverse plate moving along the Z axis;

the vertically adjustable device further comprises a first engaging edge and a second engaging edge, the first engaging edge extends outward from one side of the vertical plate; the vertically positioning device comprises a pair of vertical ribs and a vertically adjustable cover, the vertical ribs are disposed on the top face of the outer housing, the vertically adjustable cover comprises a plurality of positioning slots substantially complementing a shape to the vertical ribs, and the vertically adjustable cover is located on the top face of the outer housing, whereby the vertical ribs are fitted within the positioning slots; the second engaging edge is disposed on one side of the vertically adjustable cover; the vertically adjustable member comprises a drive side comprising a neck and a threaded driven side, the neck of the drive side engages in the first engaging edge, the driven side engages in the second engaging edge so as to move along the Z axis relative to the vertically adjustable cover and drive the vertical plate moving along the Z axis.

* * * * *